US008036607B2

(12) United States Patent
Mazawa et al.

(10) Patent No.: US 8,036,607 B2
(45) Date of Patent: Oct. 11, 2011

(54) WIRELESS TERMINAL AND WIRELESS BASE STATION

(75) Inventors: Shiro Mazawa, Fujisawa (JP); Michio Iguchi, Yokohama (JP); Takanori Moritomo, Yokohama (JP); Masao Hayama, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 462 days.

(21) Appl. No.: 12/337,003

(22) Filed: Dec. 17, 2008

(65) Prior Publication Data

US 2009/0180438 A1 Jul. 16, 2009

(30) Foreign Application Priority Data

Jan. 15, 2008 (JP) ................................ 2008-005590

(51) Int. Cl.
 H04B 1/40 (2006.01)
(52) U.S. Cl. .......................................... 455/84; 455/21
(58) Field of Classification Search .................... 455/73, 455/84, 69, 226.1, 509, 21
See application file for complete search history.

(56) References Cited

U.S. PATENT DOCUMENTS

| 6,466,348 B1* | 10/2002 | Izumi ............................ 398/177 |
| 7,616,955 B2* | 11/2009 | Kim ................................ 455/434 |
| 2003/0100267 A1* | 5/2003 | Itoh et al. ........................ 455/69 |
| 2004/0208148 A1 | 10/2004 | Cooper |
| 2005/0094589 A1 | 5/2005 | Camp, Jr. |
| 2006/0105767 A1* | 5/2006 | Kim ............................... 455/434 |
| 2007/0116209 A1* | 5/2007 | Geile et al. ................. 379/93.01 |
| 2007/0255797 A1 | 11/2007 | Dunn et al. |
| 2007/0275746 A1 | 11/2007 | Bitran |
| 2008/0045145 A1* | 2/2008 | Nakatsugawa ............... 455/11.1 |

FOREIGN PATENT DOCUMENTS

| CN | 1349688 A | 5/2002 |
| CN | 1768491 A | 5/2006 |
| EP | 1 164 719 A1 | 12/2001 |
| JP | 2005-136616 A | 5/2005 |
| JP | 2007-534221 A | 11/2007 |
| WO | 2004/057893 A1 | 7/2004 |

OTHER PUBLICATIONS

3GPP2 C.S0082-0, Version 1.0, Aug. 2006, "Circuit Services Notification Application Specification for cdma2000 High Rate Packet Data".

* cited by examiner

Primary Examiner — Peguy Jean Pierre
(74) Attorney, Agent, or Firm — Mattingly & Malur, PC

(57) ABSTRACT

In a case where a switching source wireless communication system is a wireless communication system in which a transmission timing of a packet or data rate can be controlled in a wireless base station, the switching source wireless communication system, which notifies information on a timing when a wireless terminal communicates the switching destination wireless communication system with respect to the switching source wireless communication system in advance, starts time-division communication between switching destination and switching source wireless communication systems, and receives the timing information, controls a transmission timing or a data rate in accordance with the timing information.

5 Claims, 7 Drawing Sheets

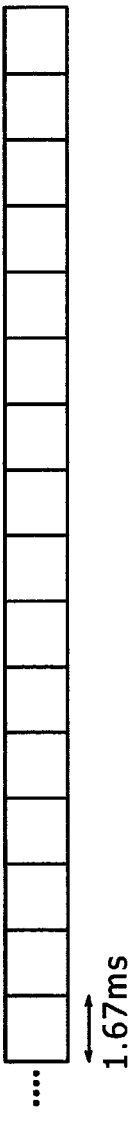
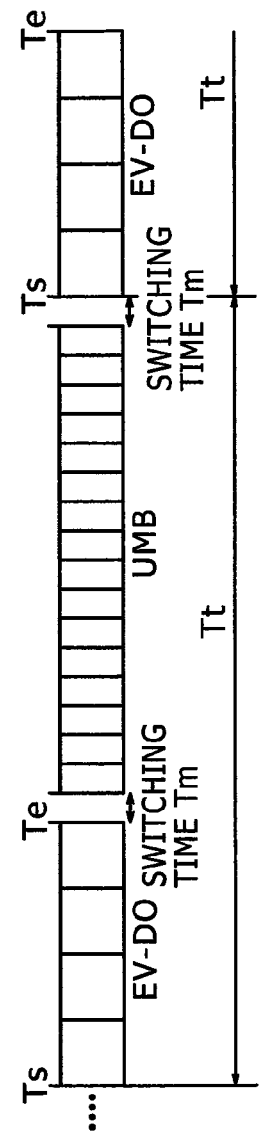
FIG. 7A EV-DO UPSTREAM TRANSMISSIBLE TIMING
FIG. 7B UMB UPSTREAM TRANSMISSIBLE TIMING
FIG. 7C WIRELESS TERMINAL UPSTREAM TRANSMISSION TIMING

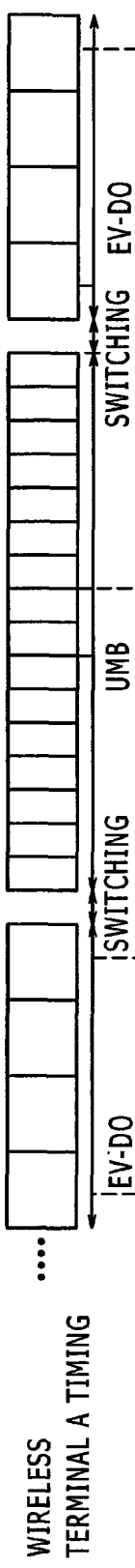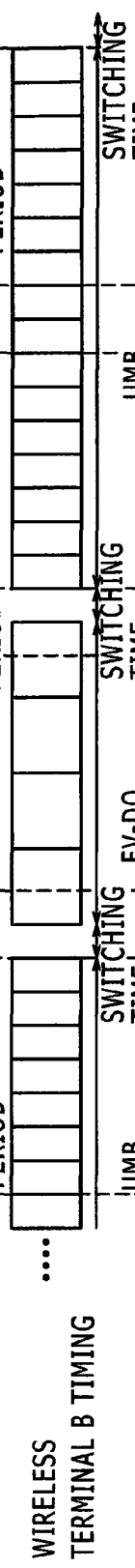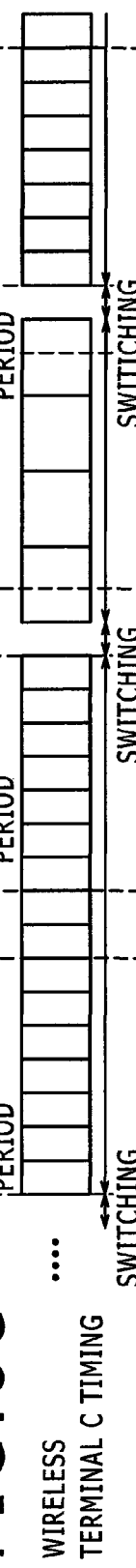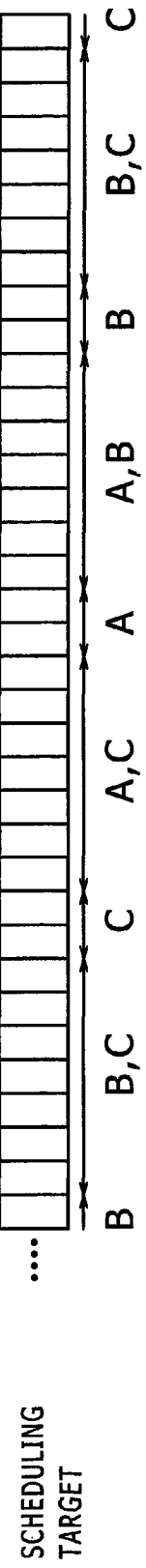
FIG. 8A WIRELESS TERMINAL A TIMING
FIG. 8B WIRELESS TERMINAL B TIMING
FIG. 8C WIRELESS TERMINAL C TIMING
FIG. 8D SCHEDULING TARGET

WIRELESS TERMINAL AND WIRELESS BASE STATION

CLAIM OF PRIORITY

The present application claims priority from Japanese patent application serial no. 2008-005590, filed on Jan. 15, 2008, the content of which is hereby incorporated by reference into this application.

BACKGROUND OF THE INVENTION

The present invention relates to a wireless terminal and a wireless base station, and more particularly, to a wireless terminal which allows time-divisional transmission to a first mobile wireless communication system and a second mobile wireless communication system, wherein the wireless base station can control a transmission timing of the wireless terminal.

In order to cope with a rapidly increasing demand for wireless communication, new wireless communication systems have been continuously created. Therefore, various methods are implemented as a method of switching a wireless communication system (hereinafter, referred to as 'inter-system hand off'). The inter-system hand off includes hand off between mobile wireless communication systems and hand off between the mobile wireless communication system and a fixed wireless communication system. An example of the former is an inter-system hand off between cdma2000 1xEV-DO and cdma2000 1x and an example of the latter is an inter-system hand off between cdma2000 1xEV-DO and a wireless LAN.

The method of implementing the inter-system hand off is largely classified into two methods. One of them is a method in which a switching source wireless communication system and a switching destination wireless communication system are independent from each other, the wireless terminal autonomously switches a system of a communication target when determining that the inter-system hand off is necessary and then starts communication with the switching destination wireless communication system.

The other is a method in which the switching source wireless communication system and the switching destination wireless communication system are connected to each other through a network, and the wireless terminal previously starts the communication with the switching destination wireless communication system through the switching source wireless communication system to switch the system of the communication target. The latter has an advantage in that a switching time is shorter since the communication starts in advance. A method in which the communication of cdma2000 1x is performed on cdma2000 1xEV-DO through tunneling is disclosed in the 3gpp2, C. S0082 ver. 1.0, Circuit Services Notification Application Specification for cdma2000 High Rate Packet Data.

As data communication is paused during acquisition/exchange of parameters, authentication, etc. with the switching destination wireless communication system, a method in which a wireless terminal starts communication with a switching destination wireless communication system after autonomously switching a communication target system has a disadvantage that a service stop time is long from a user's viewpoint.

Meanwhile, since acquisition/exchange of parameters, authentication, etc. are performed in advance, a method of performing switching by previously performing communication with a switching destination wireless communication system through a switching source wireless communication system has an advantage that a service is not stopped. In this method, however, the switching source wireless communication system and the target wireless communication system need to be connected to each other through a network in advance and a structure of tunneling the communication with the switching destination wireless communication system needs to be established in the switching source wireless communication system. Therefore, this method has a disadvantage in that a usable case is limited.

SUMMARY OF THE INVENTION

The present invention is contrived to solve the above-mentioned problem and provides a wireless terminal and a wireless base station which allows simultaneous transmission to a first wireless network system and a second wireless network system by implementing time-division communication to a switching destination wireless communication system and to a switching source wireless communication system.

In order to solve the problem, in a case where a switching source wireless communication system is a wireless communication system in which a transmission timing of a packet or data rate can be controlled by a wireless base station, the wireless terminal notifies the switching source wireless communication system of the timing information when the wireless terminal communicates with the switching destination wireless communication system in advance, and starts time-division communication to the switching destination wireless communication system and to the switching source wireless communication system. Then, the switching source wireless communication system controls a transmission timing and the data rate in accordance with the timing information of the switching destination wireless communication system.

In order to solve the above-mentioned problems, a wireless terminal includes an RF transmission unit that converts a baseband signal of a wireless system into a high-frequency signal, a control channel modulation unit that modulates control information to convert the control information into the baseband signal, and a control unit that controls the control channel modulation unit and controls an upstream transmission timing by a base station of the wireless communication system.

Further, in order to solve the above-mentioned problems, a wireless base station includes an RF reception unit that converts an upstream high-frequency signal into an upstream baseband signal; a control channel demodulation unit that extracts upstream control information from the upstream baseband signal; and an upstream allocation control unit that selects a wireless terminal as an upstream transmission target on the basis of the upstream control information.

BRIEF DESCRIPTION OF THE DRAWINGS

Preferred embodiments of the present invention will now be described in conjunction with the accompanying drawings, in which;

FIGS. 7A to 7C are timing charts illustrating an upstream data transmission timing of a wireless terminal; and FIGS. 8A to 8D are timing charts illustrating timings of three wireless terminals and a UMB wireless base station.

DETAILED DESCRIPTION OF THE PREFERRED EMBODIMENTS

Figure 1:
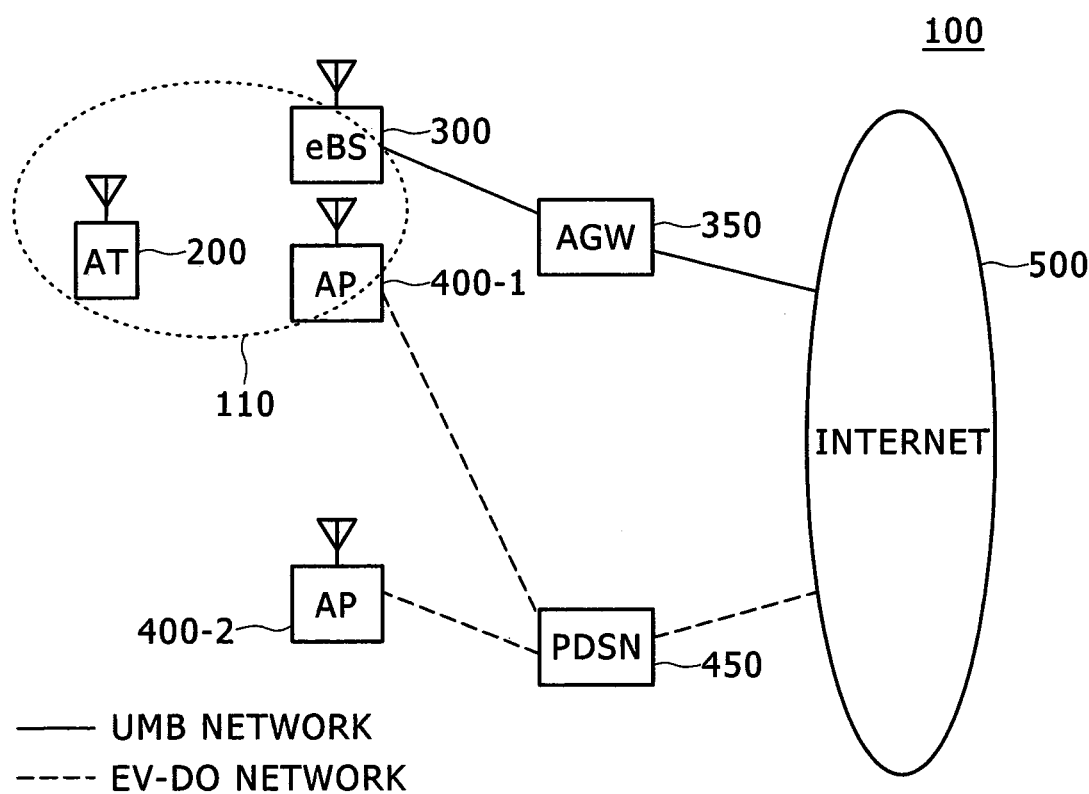
FIG. 1 is a block diagram of a wireless communication system.

Hereinafter, modes of the invention will be described with reference to the accompanying drawings using the embodiments. Like reference numerals refer to like elements. Like descriptions thereof will be omitted. Herein, the embodiments below will be described on the basis of inter-system hand off to 1xEV-DO Rev. A from an ultra mobile broadband (UMB) Rev. 0 that has been standardized in the 3gpp2. However, the wireless communication system is not limited thereto.

Herein, the UMB Rev. 0 is a mobile wireless communication method using orthogonal frequency division multiple access (OFDMA) for both upstream and downstream transmission. Meanwhile, the 1xEV-DO Rev. A is a mobile wireless communication method that uses the hybrid of code division multiple access (CDMA) and time division multiple access (TDMA) in the downstream transmission, and uses the CDMA in the upstream transmission. Referring to FIG. 1, the configuration of the wireless communication system will be described. Herein, FIG. 1 is a block diagram of the wireless communication system. In FIG. 1, a wireless communication system 100 includes a UMB network and an EV-DO network. Each of the networks is connected to the Internet 500. Further, in the wireless communication system 100, an area of the UMB network is included in an area of the EV-DO network.

In the UMB network, an evolved base station (eBS) 300, as a UMB wireless base station, is connected to the Internet 500 via an access gateway (AGW) 350 as a gateway with the Internet. In the EV-DO network, an access point (AP) 400, as an EV-DO wireless base station, is connected to the Internet 500 via a packet data switching node (PDSN) 450 as the gateway with the Internet. An access terminal (AT) 200, as the wireless terminal, exists in an area 110, and communicates with an eBS 300 and/or an AP400-1.

Figure 2:
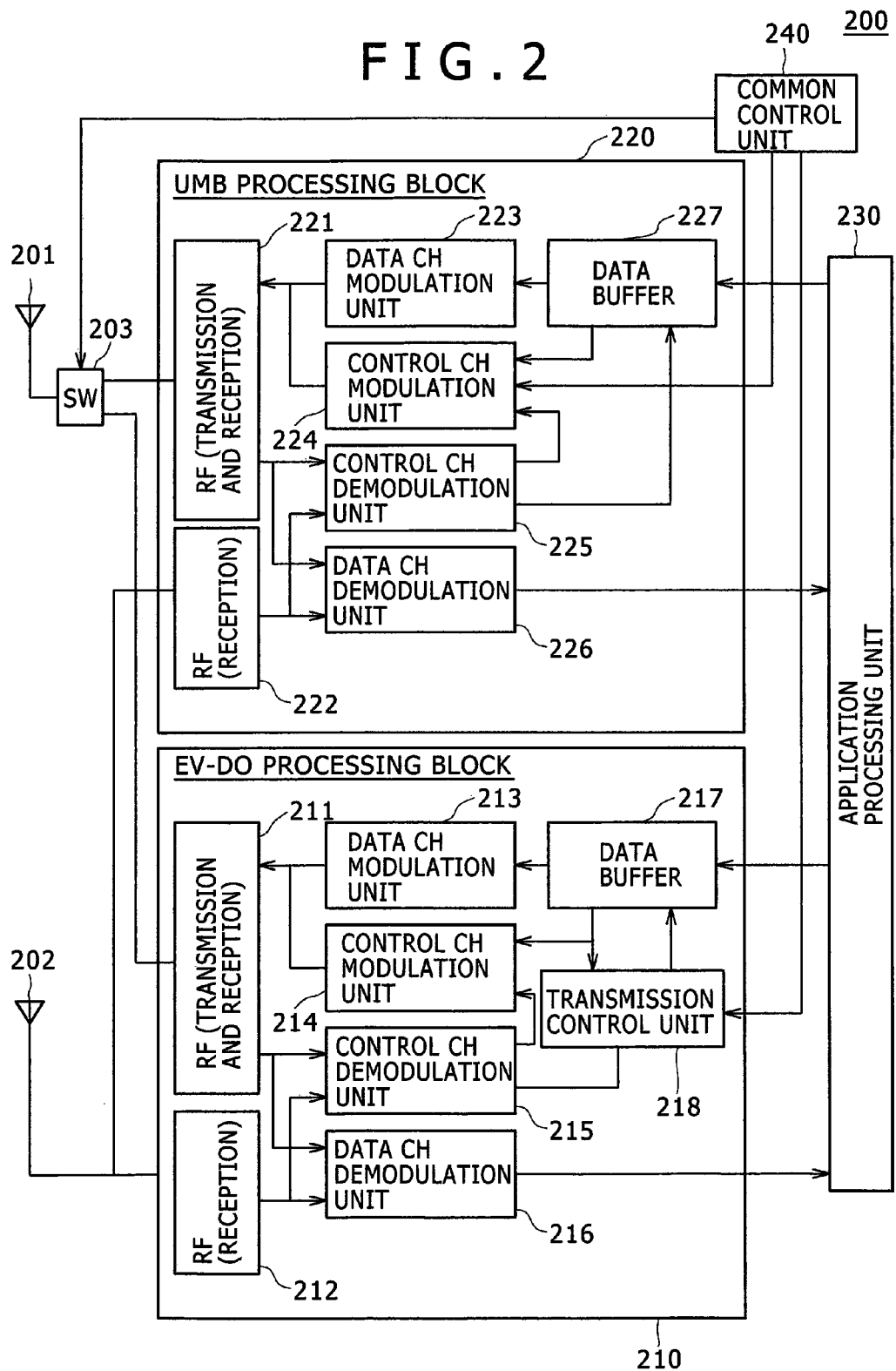
FIG. 2 is a functional block diagram of a wireless terminal.

Referring to FIG. 2, the configuration of the wireless terminal will be described. Herein, FIG. 2 is a functional block diagram of the wireless terminal. In FIG. 2, the wireless terminal 200 includes a UMB processing block 220, an EV-DO processing block 210, a common control unit 240, an application processing unit 230, a reception antenna 202, a transmission and reception antenna 201, and a switch 203 that switches a transmission source and a reception destination of the transmission and reception antenna 201 into each other.

The UMB processing block 220 and the EV-DO processing block 210 commonly use the antennas 201 and 202. The antenna 201 is commonly used for transmission and reception, and is connected to the switch 203 for switching any one of the signals of the UMB and EV-DO processing blocks 210 and 220. The antenna 202 is used only for reception and is connected to both the UMB and the EV-DO. Accordingly, the transmission is available in any one of the UMB and the EV-DO and the reception is possible in both the UMB and the EV-DO processing blocks 210 and 220.

The UMB processing block 220 includes RF units 221 and 222 that convert a high-frequency signal and a low-frequency baseband signal into each other, a data channel modulation unit 223 that modulates transmission data to convert the transmission data into the baseband signal, a control channel modulation unit 224 that modulates control information to convert the control information into the baseband signal, a control channel demodulation unit 225 that demodulates a received signal to extract the control information, a data channel demodulation unit 226 that demodulates and decodes the received signal to extract received data, and a data buffer 227 that temporarily buffers transmission data.

The EV-DO processing block 210 includes RF units 211 and 212 that convert the high-frequency signal and the low-frequency baseband signal into each other, a data channel modulation unit 213 that modulates the transmission data to convert the transmission data into the baseband signal, a control channel modulation unit 214 that modulates the control information to convert the control information into the baseband signal, a control channel demodulation unit 215 that demodulates a received signal to extract the control information, a data channel demodulation unit 216 that demodulates and decodes the received signal to extract received data, a data buffer 217 that temporarily buffers the transmission data, and a transmission control unit 218 that controls the transmission on the basis of a buffer amount or a control channel demodulation result.

The common control unit 240 controls the switch 203 in accordance with the transmission timing of the UMB or the EV-DO. The common control unit 240 notifies the transmission timing used in the EV-DO to the transmission control unit 218. Further, the common control unit 240 notifies timing information used in the UMB to the control channel modulation unit 224. The control channel modulation unit 224 notifies the timing information of the EV-DO to the eBS 300 through a wireless link.

Further, the wireless terminal 200 includes the application processing unit 230 that commonly processes an application in both the UMB and the EV-DO.

The wireless terminal 200 includes the reception antenna 202 and the RF units 212 and 222. Therefore, even when the RF unit 221 of the UMB transmits an upstream signal through the antenna 201, the RF unit 212 of the EV-DO can receive a downstream signal. On the contrary, even when the RF unit 211 of the EV-DO transmits the upstream signal, the RF unit 222 of the UMB can receive the downstream signal.

In FIG. 2, the difference between the UMB processing block 220 and the EV-DO processing block 210 is the existence or nonexistence of the transmission control unit 218. The reason is that the transmission timing and the data rate of an upstream link of the UMB are determined by the eBS, the wireless terminal just follows the transmission timing and the data rate, while the wireless terminal itself determines the transmission timing and the data rate of an upstream link of the EV-DO with the transmission control unit 218. Further, FIG. 2 is a functional block diagram illustrating a state in which the UMB processing block 220 and the EV-DO processing block 210 are completely separated from each other. However, commonly usable parts may be commonly used. Further, the common control unit 240 controls a transmission timing between the EV-DO transmission control 218 and the UMB control channel modulation unit 224, but the common control unit 240 may control the transmission timing with the UMB control channel modulation unit 224 on the basis of the transmission timing of the EV-DO transmission control unit 218.

Figure 3:
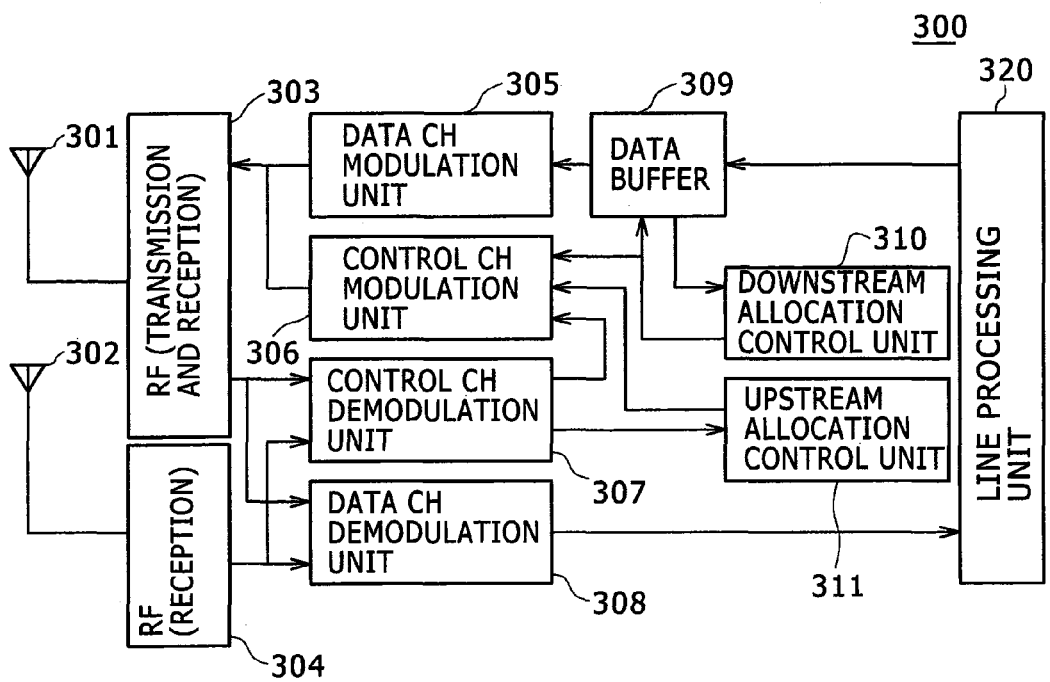
FIG. 3 is a functional block diagram of a UMB base station.

Referring to FIG. 3, the configuration of the UMB wireless base station will be described. Herein, FIG. 3 is a functional block diagram of a UMB base station. In FIG. 3, the UMB base station 300 includes antennas 301 and 302 that transmit and receive radio waves to and from the wireless terminal 200 in the area 110 to convert the radio waves into high-frequency electric signals, RF units 303 and 304 that convert the high-frequency signal and the low-frequency baseband signal into each other, a data channel modulation unit 305 that modulates the transmission data to convert the transmission data into the baseband signal, a control channel modulation unit 306 that modulates the control information to convert the control information into the baseband signal, a control channel demodulation unit 307 that demodulates a received signal to extract the control information, a data channel demodulation unit 308 that demodulates and decodes the received signal to extract received data, a data buffer 309 that temporarily buffers the transmission data, a downstream allocation control unit 310 that selects a wireless terminal as a downstream transmission destination target on the basis of the buffer amount or the control channel demodulation result, and determines the data rate and an allocation band, an upstream allocation control unit 311 that selects a wireless terminal as an upstream transmission source target on the basis of the control channel demodulation result, and determines the data rate and an allocation band, and a line processing unit 320 which is an I/F with an AGW 350.

Figure 4:
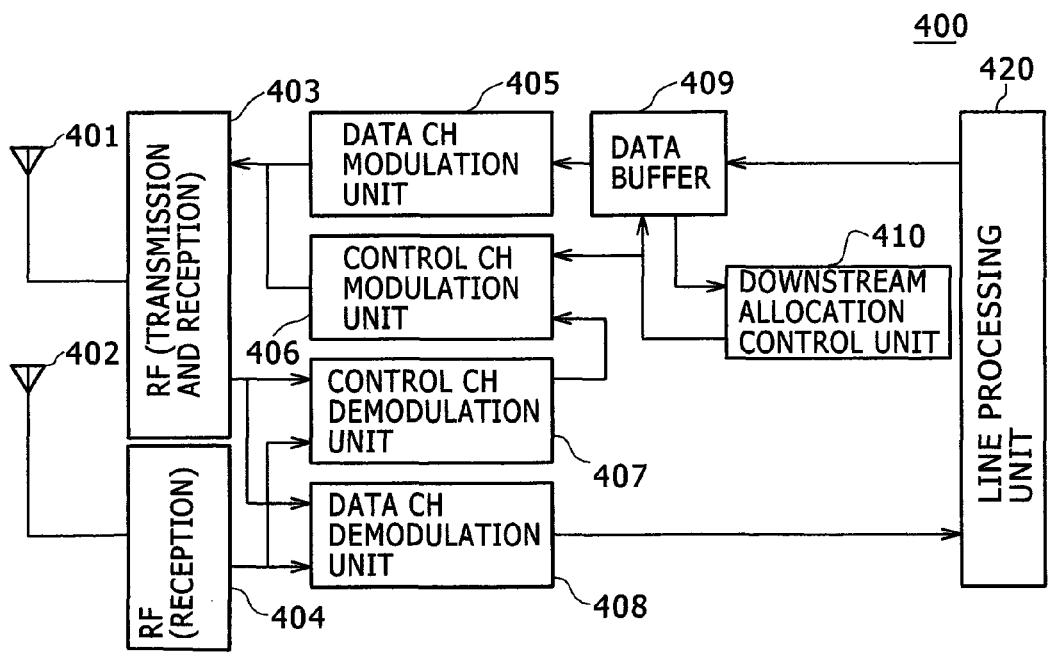
FIG. 4 is a functional block diagram of an EV-DO base station.

Referring to FIG. 4, the configuration of an EV-DO wireless base station will be described. Herein, FIG. 4 is a functional block diagram of the EV-DO base station. In FIG. 4, an EV-DO wireless base station 400 includes antennas 401 and 402 that transmit and receive the radio waves to and from the wireless terminal 200 in the area 110 to convert the radio waves into the high-frequency electric signals, RF units 403 and 404 that convert the high-frequency signal and the low-frequency baseband signal into each other, a data channel modulation unit 405 that modulates the transmission data to convert the transmission data into the baseband signal, a control channel modulation unit 406 that modulates the control information to convert the control information into the baseband signal, a control channel demodulation unit 407 that demodulates a received signal to extract the control information, a data channel demodulation unit 408 that demodulates and decodes the received signal to extract received data, a data buffer 409 that temporarily buffers the transmission data, a downstream allocation control unit 410 that selects a user as a downstream transmission target on the basis of the buffer amount or the control channel demodulation result, and a line processing unit 420 which is an I/F with the PDSN 450.

The EV-DO wireless base station 400 has two differences from the UMB wireless base station 300. One of them is the roles of the downstream allocation control units 310 and 410. The downstream allocation control unit 310 of the UMB wireless base station 300 determines the data rate and the allocation band in addition to the allocation user on the basis of information on a link quality received from the wireless terminal. Meanwhile, in the EV-DO, since the wireless terminal itself determines the data rate, the downstream allocation control unit 410 of the wireless base station 400 performs only selection of the allocation user. The other difference is the existence or nonexistence of the upstream allocation control unit 311. In the UMB, the upstream allocation control unit 311 of the UMB wireless base station 300 determines the data rate and the allocation band in addition to the allocation user on the basis of information such as the buffer amount received and the link quality measured from the wireless terminal. Meanwhile, in the EV-DO, the wireless terminal itself determines the transmission timing and the data rate.

Figures 5A, 5B:
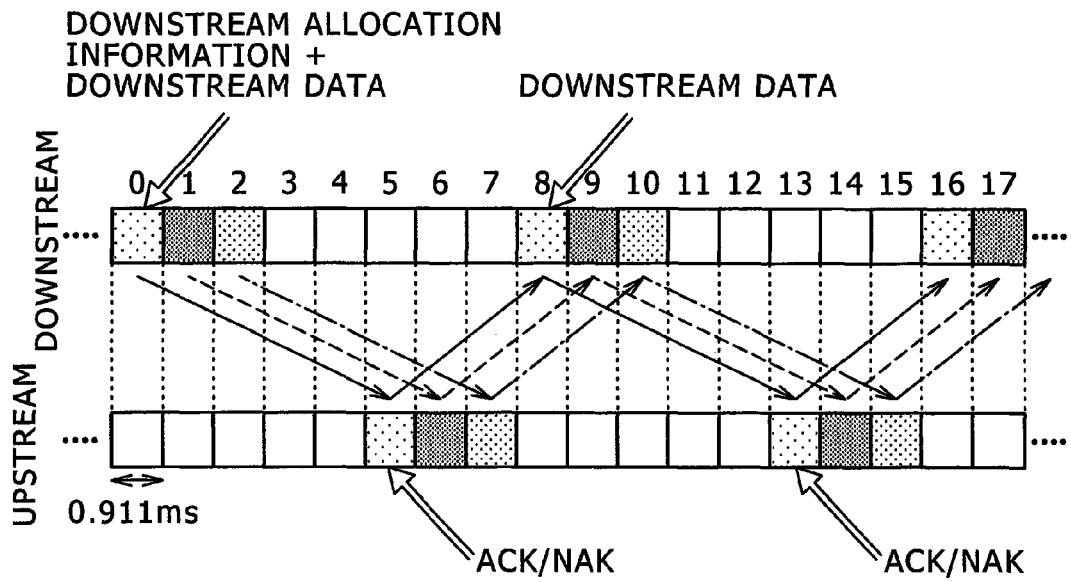
FIGS. 5A and 5B are timing charts illustrating upstream and downstream transmission and reception timings of UMB Rev. 0.
Figure 6A:
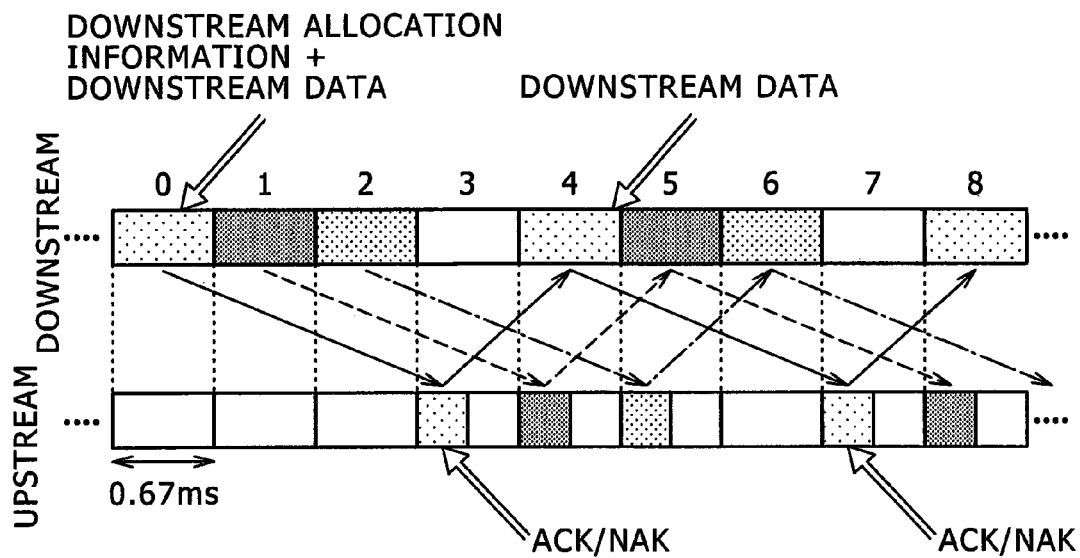
FIGS. 6A and 6B are timing charts illustrating upstream and downstream transmission and reception timings of the 1xEV-DO Rev. A.
Figure 6B:
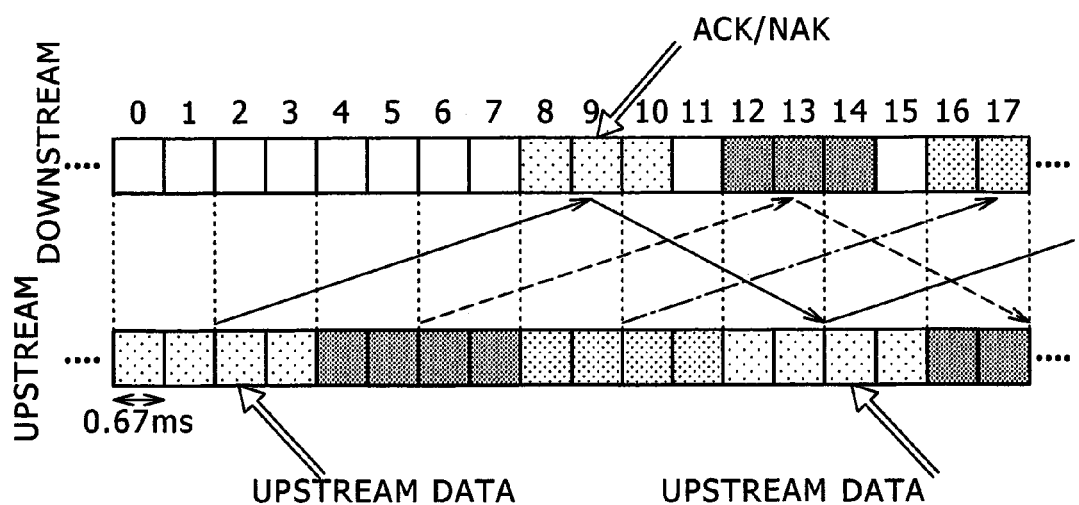

Referring to FIGS. 5A and 5B and FIGS. 6A and 6B, transmission and reception timings of the UMB Rev. 0 and the 1xEV-DO Rev. A will be described. Herein, FIGS. 5A and 5B are timing charts illustrating upstream and downstream transmission and reception timings of the UMB Rev. 0. FIGS. 6A and 6B are timing charts illustrating upstream and downstream transmission and reception timings of the 1xEV-DO Rev. A. Further, FIG. 6A and FIG. 6B are different from each other in a time-base scale.

Both the UMB Rev. 0 and the 1xEV-DO Rev. A use a technology called a hybrid automatic repeat request (H-ARQ) in both the upstream and downstream transmission and reception. The H-ARQ notifies of the success or failure of demodulation on a dedicated channel called an Ack Channel when the data is received. In the case of a reception failure, in the H-ARQ, a transmission side receiving the reception failure retransmits the data and the reception side retries decoding by combining a soft decision value in the previous transmission and a soft decision value in the retransmission. Therefore, the wireless communication system using the H-ARQ requires time period when the transmission side determines and codes the transmission data, time period when the transmission side transmits the data, time period when the reception side decodes the data, and time period when the reception side transmits the Ack Channel with respect to one data transmission, and repeats the times at a constant cycle.

In FIGS. 5A and 5B, in the case of the UMB, a time unit of the transmission and reception is called a PHY frame, one-time data transmission (including ACK/NACK) is one (1) PHY frame, and a time length is 0.911 ms. Even in the upstream and downstream transmission and reception, one cycle when the H-ARQ is repeated is eight (8) PHY frames. In UMB, time from data transmission start to ACK transmission start is five (5) PHY frames and time from the ACK transmission start to data retransmission start is three (3) PHY frames. Further, in FIG. 5B, in the UMB, the upstream link is also allocated and controlled by the wireless base station and time from an upstream allocation control information transmission start to upstream data transmission start is also 3 PHY frames. Upstream allocation information includes the upstream transmission data rate as well as the timing.

In FIGS. 6A and 6B, in the case of the EV-DO, a time unit of the transmission and reception is called a slot and a length of one slot is 1.67 ms. In the case of the downstream data transmission of FIG. 6A, a cycle when the H-ARQ is repeated is four (4) slots, one-time data transmission is one slot, time from downstream data transmission start to the ACK/NAK transmission start is three (3) slots, and time from the ACK/NAK transmission start to the downstream data retransmission start is one (1) slot. Further, a length of an upstream ACK/NAK is 0.5 slots. In the case of the upstream data transmission of FIG. 6B, a cycle when the H-ARQ is repeated is twelve (12) slots, one-time data transmission is four (4) slots, time from upstream data transmission start to the ACK/NAK transmission start is eight (8) slots, and time from the ACK/NAK transmission start to the upstream data retransmission start is four (4) slots. Further, a length of a downstream ACK/NAK is three (3) slots.

Referring to FIGS. 7A to 7C, the upstream data transmission timing of the wireless terminal will be described. Herein, FIGS. 7A to 7C are charts illustrating an upstream data transmission timing of the wireless terminal. FIG. 7A illustrates an EV-DO upstream data transmissible timing. FIG. 7B illustrates a UMB upstream data transmissible timing. FIG. 7C illustrates an upstream data transmission timing of the wireless terminal. As clearly shown in FIGS. 7A to 7C, the wireless terminal 200 uses 4 slots for EV-DO transmission and the rest 8 slots for UMB transmission among 12 slots of the upstream link. Therefore, the time-division upstream data transmission of the EV-DO and the UMB is implemented. That is, in the EV-DO, since the wireless terminal itself determines the transmission timing and the data rate, the upstream data transmission timing is allocated to a vacant transmission timing by the wireless base station 300 of the UMB by taking preference of the upstream data transmission timing of the EV-DO.

The wireless terminal 200 that is in communication with the UMB wireless base station 300 notifies a total communication cycle Tt of the EV-DO as a time-division communication target, a transmission start time Ts within the cycle, a transmission end time Te within the cycle, and a time Tm taken to switch the transmission system, to the UMB wireless base station 300.

The upstream allocation control unit 311 of the UMB wireless base station 300, which receives the notification, performs two steps of processing. In the first step, in a case where a transmission start timing T and a transmission end timing T+0.911 overlap with the EV-DO transmission timing, that is, in a case where Ts−Tm≦T+0.911 and T≦Te+Tm, the upstream allocation control unit 311 judges that the wireless terminal 200 communicates not by the UMB but by the EV-DO at the timing, and excludes the wireless terminal 200 from the transmission allocation control target in the PHY frame thereof.

In a second processing, the upstream allocation control unit 311 calculates how many times the transmission start timing and the transmission end timing overlap with the EV-DO timing among the number of transmission times from the H-ARQ and decreases the allocation data rate depending on the number of times. In other words, in a case where the transmission start timing and the transmission end timing overlap with the EV-DO transmission timing at four times among the maximum eight-time retransmissions, since a spreading rate is a half, the data rate is set to a half of the normal allocation.

Referring to FIGS. 8A to 8D, the scheduling of the UMB wireless base station will be described. Herein, FIGS. 8A to 8D are timing charts illustrating timings of three wireless terminals and the UMB wireless base station. FIGS. 8A to 8C are transmission timings of wireless terminals 200A, 200B, and 200C, respectively. FIG. 8D illustrates a name of a terminal allocable to the PHY frame at the timing of the UMB wireless base station.

The wireless terminals 200A, 200B, and 200C are different from each other in interlacing used in the EV-DO, and transmit the EV-DO upstream data signals at different timings. The upstream allocation control unit 311 of the UMB wireless base station 300, which receives the total communication cycle Tt of the EV-DO, the transmission start time Ts within the cycle, the transmission end time Te within the cycle, and the time Tm taken to switch the transmission system from each of the wireless terminals 200A, 200B, and 200C, performs a scheduling operation excluded from the transmission allocation control target in the PHY frame when the transmission start timing T and the transmission end timing T+0.911 of each of the wireless terminals 200A, 200B, and 200C overlap with the EV-DO transmission timing. Therefore, the remaining terminals are shown in FIG. 8D.

According to the embodiment, since the communication of the EV-DO is previously started and switched through the UMB, acquisition and exchange of parameters, authentication, etc. can be previously performed, thereby preventing service from being stopped. As a result, it is possible to provide hand off between the UMB and the EV-DO which have a short switching time.

According to the embodiment, it is possible to implement time-division communication between two wireless communication systems that are not connected to each other.

What is claimed is:

1. A wireless terminal which allows time-divisional transmission to a first wireless communication system and a second wireless communication system, comprising:
   a first control channel modulation unit which modulates control signals to the first wireless communication system;
   a first data channel modulation unit which modulates data signals to the first wireless communication system;
   a first RF unit which converts outputs of the first control channel modulation unit and the first data channel modulation unit into high-frequency signals;
   a second control channel modulation unit which modulates control signals to the second wireless communication system;
   a second data channel modulation unit which modulates data signals to the second wireless communication system;
   a second RF unit which converts outputs of the second control channel modulation unit and the second data channel modulation unit into high-frequency signals;
   a transmission control unit which controls a second transmission timing to the second wireless communication system;
   a switch which selects an output from one of the first RF unit and the second RF unit; and
   a common control unit which controls the transmission control unit, the first control channel modulation unit and the switch;
   wherein said common control unit controls a first transmission timing to the first wireless communication system based upon said second transmission timing for the second wireless communication system.

2. The wireless terminal, according to claim 1, wherein said common control unit notifies the second transmission timing for the second communication network to the first communication network by use of the first control channel modulation unit.

3. The wireless terminal, according to claim 1, wherein said common control unit notifies the second transmission timing for the second communication network to the first communication network by use of the first data channel modulation unit.

4. A wireless base station comprising:
   a control channel demodulation unit which receives upstream control information; and
   an upstream allocation control unit which selects a wireless terminal to transmit upstream control/data signal based upon the upstream control information,
   wherein said upstream allocation control unit determines a first upstream transmission timing of the wireless terminal depending upon a second upstream transmission timing, which is received from the wireless terminal, for the other communication network.

5. The wireless base station, according to claim 4, wherein said upstream allocation control unit determines a rate of upstream data/control signal depending upon a length of the second upstream transmission timing.

* * * * *

UNITED STATES PATENT AND TRADEMARK OFFICE
CERTIFICATE OF CORRECTION

PATENT NO. : 8,036,607 B2 Page 1 of 1
APPLICATION NO. : 12/337003
DATED : October 11, 2011
INVENTOR(S) : Shiro Mazawa et al.

It is certified that error appears in the above-identified patent and that said Letters Patent is hereby corrected as shown below:

On the title page, item:

(73) Assignee: "Hitachi Communication Technologies, Ltd.," should read
--Hitachi, Ltd.,-- Tokyo (JP)

Signed and Sealed this
Twenty-fourth Day of January, 2012

David J. Kappos
*Director of the United States Patent and Trademark Office*